US011394492B2

(12) United States Patent
Noh et al.

(10) Patent No.: US 11,394,492 B2
(45) Date of Patent: Jul. 19, 2022

(54) BINARY CONVOLUTIONAL CODING (BCC) INTERLEAVER, DUAL SUB-CARRIER MODULATION (DCM) CONSTELLATION MAPPER, AND LOW-DENSITY PARITY-CHECK (LDPC) TONE MAPPER DESIGN

(71) Applicant: NEWRACOM, Inc., Lake Forest, CA (US)

(72) Inventors: Yujin Noh, Irvine, CA (US); Jaeyoung Ryu, irvine, CA (US); Dae Kyun Lee, Irvine, CA (US); Jong-ee Oh, Irvine, CA (US); Minseoung Kim, Irvine, CA (US)

(73) Assignee: NEWRACOM, Inc., Lake Forest, CA (US)

( * ) Notice: Subject to any disclaimer, the term of this patent is extended or adjusted under 35 U.S.C. 154(b) by 21 days.

(21) Appl. No.: 16/838,852

(22) Filed: Apr. 2, 2020

(65) Prior Publication Data

US 2020/0322091 A1 Oct. 8, 2020

Related U.S. Application Data

(60) Provisional application No. 62/828,382, filed on Apr. 2, 2019, provisional application No. 62/832,481, filed
(Continued)

(51) Int. Cl.
*H04L 1/00* (2006.01)
*H04W 72/04* (2009.01)
(Continued)

(52) U.S. Cl.
CPC .......... *H04L 1/0071* (2013.01); *H04L 1/0047* (2013.01); *H04L 1/0057* (2013.01);
(Continued)

(58) Field of Classification Search
CPC ... H04L 1/0071; H04L 1/0047; H04L 1/0057; H04L 1/0059; H04L 5/001;
(Continued)

(56) References Cited

U.S. PATENT DOCUMENTS

2017/0104553 A1\* 4/2017 Liu ..................... H04L 27/2626
2017/0126447 A1\* 5/2017 Yang ........................ H04L 1/04

FOREIGN PATENT DOCUMENTS

WO  WO-2015076932 A1 \*  5/2015  ........... H04B 7/0413

OTHER PUBLICATIONS

IEEE Std 802.11—2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.
(Continued)

*Primary Examiner* — Hardikkumar D Patel
(74) *Attorney, Agent, or Firm* — Nicholson, De Vos, Webster & Elliott, LLP

(57) ABSTRACT

A method for encoding a bitstream for a frame in a wireless transmission is described. The method includes receiving, by an error correction unit of the wireless device, the bitstream; performing, by the error correction unit, forward error correction on the bitstream to generate an error corrected bitstream; determining, by a dual sub-carrier modulation (DCM) mapper of the first wireless device, a number of data subcarriers for modulating the error corrected bitstream to subcarriers in each half of an orthogonal frequency-division multiplexing (OFDM) symbol, wherein the number of data subcarriers is determined to be (1) 26 for a first bandwidth of the frame, (2) 54 for a second bandwidth and performing, by the DCM mapper, DCM on the error corrected bitstream based on the determined number of data
(Continued)

subcarriers to generate a stream of complex numbers corresponding to the number of data subcarriers.

16 Claims, 38 Drawing Sheets

Related U.S. Application Data on Apr. 11, 2019, provisional application No. 62/858,920, filed on Jun. 7, 2019.

(51) Int. Cl.
  *H04L 5/00* (2006.01)
  *H04L 27/26* (2006.01)
  *H04W 4/80* (2018.01)
  *H04W 4/40* (2018.01)

(52) U.S. Cl.
  CPC ............ *H04L 1/0059* (2013.01); *H04L 5/001* (2013.01); *H04L 27/2601* (2013.01); *H04W 72/044* (2013.01); *H04W 4/40* (2018.02); *H04W 4/80* (2018.02)

(58) Field of Classification Search
  CPC . H04L 27/2601; H04L 1/0041; H04L 1/0045; H04L 27/26025; H04L 27/2602; H04L 27/2628; H04L 27/28; H04W 72/044; H04W 4/80; H04W 4/40
  See application file for complete search history.

(56) References Cited

OTHER PUBLICATIONS

IEEE Std 802.11ac—2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

IEEE Std 802.11ah—2016, "Part 11: Wireless LAN Medium Access Control (MAC) and Physical Layer (PHY) Specifications, Amendment 2: Sub 1 GHz License Exempt Operation", IEEE Standard for Information technology—Telecommunications and information exchange between systems, Local and metropolitan area networks—Specific requirements, 2016, 594 pages.

* cited by examiner

| ELEMENT/FIELD | DEFINITION 702 | DURATION 704 | DFT PERIOD 706 | GUARD INTERVAL (GI) 708 | SUBCARRIER SPACING 710 | DESCRIPTION 712 |
|---|---|---|---|---|---|---|
| LEGACY-SHORT TRAINING FIELD (L-STF) 714 | NON-HIGH THROUGHPUT(HT) SHORT TRAINING FIELD (STF) | 16 μs | - | - | - | - |
| LEGACY-LONG TRAINING FIELD (L-LTF) 716 | NON-HT LONG TRAINING FIELD (LTF) | 16 μs | 6.4 μs | 3.2 μs | 156.25 kHz | - |
| LEGACY-SIGNAL FIELD (L-SIG) 718 | NON-HT SIGNAL FIELD | 8 μs | 6.4 μs | 1.6 μs | 156.25 kHz | - |
| DATA 720 | HIGH EFFICIENCY (HE) DATA FIELD | $N_{DATA}$ * (DFT PERIOD +GI) μs | 6.4 μs | 1.6 μs | 156.25 kHz | $N_{DATA}$ IS THE NUMBER OF 802.11P DATA SYMBOLS |

FIG. 7

| Parameter | Value (20 MHz channel spacing) | Value (10 MHz channel spacing) |
|---|---|---|
| $N_{SD}$: Number of data subcarriers | 48 | 48 |
| $N_{SP}$: Number of pilot subcarriers | 4 | 4 |
| $N_{ST}$: Number of subcarriers, total | 52 ($N_{SD} + N_{SP}$) | 52 ($N_{SD} + N_{SP}$) |
| $\Delta_F$: Subcarrier frequency spacing | 0.3125 MHz (= 20 MHz/64) | 0.15625 MHz (= 10 MHz/64) |
| $T_{FFT}$: Inverse Fast Fourier Transform (IFFT) / Fast Fourier Transform (FFT) period | 3.2 μs (1/$\Delta_F$) | 6.4 μs (1/$\Delta_F$) |
| $T_{PREAMBLE}$: PHY preamble duration | 16 μs ($T_{SHORT} + T_{LONG}$) | 32 μs ($T_{SHORT} + T_{LONG}$) |
| $T_{SIGNAL}$: Duration of the SIGNAL BPSK-OFDM symbol | 4.0 μs ($T_{GI} + T_{FFT}$) | 8.0 μs ($T_{GI} + T_{FFT}$) |
| $T_{GI}$: GI duration | 0.8 μs ($T_{FFT}/4$) | 1.6 μs ($T_{FFT}/4$) |
| $T_{GI2}$: Training symbol GI duration | 1.6 μs ($T_{FFT}/2$) | 3.2 μs ($T_{FFT}/2$) |
| $T_{SYM}$: Symbol interval | 4 μs ($T_{GI} + T_{FFT}$) | 8 μs ($T_{GI} + T_{FFT}$) |
| $T_{SHORT}$: Short training sequence duration | 8 μs (10 × $T_{FFT}/4$) | 16 μs (10 × $T_{FFT}/4$) |
| $T_{LONG}$: Long training sequence duration | 8 μs ($T_{GI2} + 2 × T_{FFT}$) | 16 μs ($T_{GI2} + 2 × T_{FFT}$) |

FIG. 8

| OFDM NUMEROLOGY 1402 | N_FFT 1404 | N_SD 1406 | SUBCARRIER SPACING 1408 | DOWNCLOCK RATIO 1410 |
|---|---|---|---|---|
| 802.11N 40MHZ | 128 | 108 | 156.25 kHz | 2 |
| 802.11AC 40MHZ | 128 | 108 | 156.25 kHz | 2 |
| 802.11AC 80MHZ | 256 | 234 | 78.125 kHz | 4 |

FIG. 14

|  | 10MHZ | 20MHZ | 40MHZ |
|---|---|---|---|
| $N_{SD}$ | 26 | 54 | 117 |
| $N_{COL}$ | 13 | 18 | 13 |
| $N_{ROW}$ | $2 * N_{BPSCS}$ | $3 * N_{BPSCS}$ | $9 * N_{BPSCS}$ |

FIG. 16

|  | 10MHZ | 20MHZ | 40MHZ |
|---|---|---|---|
| $N_{SD}$ | 26 | 54 | 117 |
| $N_{COL}$ | 13 | 18 | 13 |
| $N_{ROW}$ | $2 * N_{BPSCS}$ | $3 * N_{BPSCS}$ | $9 * N_{BPSCS}$ |
| $N_{ROT}$ | 2 | 11 | 29 |

FIG. 17

|  | 10MHZ | 20MHZ | 40MHZ |
|---|---|---|---|
| $N_{SD}$ | 26 | 54 | 117 |
| $N_{COL}$ | 13 | 9 | 13 |
| $N_{ROW}$ | $2 * N_{BPSCS}$ | $6 * N_{BPSCS}$ | $9 * N_{BPSCS}$ |

FIG. 18

|  | 10MHZ | 20MHZ | 40MHZ |
|---|---|---|---|
| $N_{SD}$ | 26 | 54 | 117 |
| $N_{COL}$ | 13 | 9 | 13 |
| $N_{ROW}$ | $2 * N_{BPSCS}$ | $6 * N_{BPSCS}$ | $9 * N_{BPSCS}$ |
| $N_{ROT}(N_{SS}=1)$ | 2 | 11 | 29 |

FIG. 19

|  | 10MHZ | 20MHZ | 20MHZ (10+REPEATED 10) | 40MHZ (20+REPEATED 20) | 40MHZ |
|---|---|---|---|---|---|
| $N_{SD}$ | 26 | 54 | 26 | 54 | 117 |
| $N_{COL}$ | 13 | 18 | 13 | 18 | 13 |
| $N_{ROW}$ | $2 * N_{BPSCS}$ | $3 * N_{BPSCS}$ | $2 * N_{BPSCS}$ | $3 * N_{BPSCS}$ | $9 * N_{BPSCS}$ |

FIG. 20

|  | 10MHZ | 20MHZ | 20MHZ (10+REPEATED 10) | 40MHZ (20+REPEATED 20) | 40MHZ |
|---|---|---|---|---|---|
| $N_{SD}$ | 26 | 54 | 26 | 54 | 117 |
| $N_{COL}$ | 13 | 18 | 13 | 18 | 13 |
| $N_{ROW}$ | $2 * N_{BPSCS}$ | $3 * N_{BPSCS}$ | $2 * N_{BPSCS}$ | $3 * N_{BPSCS}$ | $9 * N_{BPSCS}$ |
| $N_{ROT}$ ($N_{SS}=1$) | 2 | 11 | 2 | 11 | 29 |

FIG. 21

|  | 10MHZ | 20MHZ | 20MHZ (10+REPEATED 10) | 40MHZ (20+REPEATED 20) | 40MHZ |
|---|---|---|---|---|---|
| $N_{SD}$ | 26 | 54 | 26 | 54 | 117 |
| $N_{COL}$ | 13 | 9 | 13 | 9 | 13 |
| $N_{ROW}$ | $2 * N_{BPSCS}$ | $6 * N_{BPSCS}$ | $2 * N_{BPSCS}$ | $6 * N_{BPSCS}$ | $9 * N_{BPSCS}$ |

FIG. 22

|  | 10MHZ | 20MHZ | 20MHZ (10+REPEATED 10) | 40MHZ (20+REPEATED 20) | 40MHZ |
|---|---|---|---|---|---|
| $N_{SD}$ | 26 | 54 | 26 | 54 | 117 |
| $N_{COL}$ | 13 | 9 | 13 | 9 | 13 |
| $N_{ROW}$ | $2 * N_{BPSCS}$ | $6 * N_{BPSCS}$ | $2 * N_{BPSCS}$ | $6 * N_{BPSCS}$ | $9 * N_{BPSCS}$ |
| $N_{ROT} (N_{SS}=1)$ | 2 | 11 | 2 | 11 | 29 |

FIG. 23

|  | 10MHZ | 20MHZ | 40MHZ |
|---|---|---|---|
| $D_{TM,DCM}$ | 1 | 3 | 6 |
| $D_{TM}$ | 4 | 6 | 9 |

FIG. 24

| | 10MHZ | 20MHZ | 40MHZ |
|---|---|---|---|
| $D_{TM,DCM}$ | 1 | 1 | 3 |
| $D_{TM}$ | 4 | 6 | 9 |

FIG. 25

| NON-DCM | 10MHZ | 10MHZ | 10MHZ | 20MHZ (10+10) | 20MHZ (10+10) | 20MHZ (10+10) |
|---|---|---|---|---|---|---|
| $N_{SD}$ | 56 | 56 | 56 | 56 | 56 | 56 |
| $N_{COL}$ | 28 | 14 | 8 | 28 | 14 | 8 |
| $N_{ROW}$ | $2 * N_{BPSCS}$ | $4 * N_{BPSCS}$ | $7 * N_{BPSCS}$ | $2 * N_{BPSCS}$ | $4 * N_{BPSCS}$ | $7 * N_{BPSCS}$ |

FIG. 26

| NON-DCM | 10MHZ | 10MHZ | 10MHZ | 20MHZ (10+10) | 20MHZ (10+10) | 20MHZ (10+10) |
|---|---|---|---|---|---|---|
| $N_{SD}$ | 56 | 56 | 56 | 56 | 56 | 56 |
| $N_{COL}$ | 28 | 14 | 8 | 28 | 14 | 8 |
| $N_{ROW}$ | $2 * N_{BPSCS}$ | $4 * N_{BPSCS}$ | $7 * N_{BPSCS}$ | $2 * N_{BPSCS}$ | $4 * N_{BPSCS}$ | $7 * N_{BPSCS}$ |
| $N_{ROT}$ ($N_{SS}=1$) | 11 | 11 | 11 | 11 | 11 | 11 |

| DCM | 10MHZ | 10MHZ | 20MHZ (10+10) | 20MHZ (10+10) |
|---|---|---|---|---|
| $N_{SD}$ | 28 | 28 | 28 | 28 |
| $N_{COL}$ | 14 | 7 | 14 | 7 |
| $N_{ROW}$ | $2 * N_{BPSCS}$ | $4 * N_{BPSCS}$ | $2 * N_{BPSCS}$ | $4 * N_{BPSCS}$ |

FIG. 28

| DCM | 10MHZ | 10MHZ | 20MHZ (10+10) | 20MHZ (10+10) |
|---|---|---|---|---|
| $N_{SD}$ | 28 | 28 | 28 | 28 |
| $N_{COL}$ | 14 | 7 | 14 | 7 |
| $N_{ROW}$ | $2 * N_{BPSCS}$ | $4 * N_{BPSCS}$ | $2 * N_{BPSCS}$ | $4 * N_{BPSCS}$ |
| $N_{ROT}$ ($N_{SS}=1$) | 2 | 2 | 2 | 2 |

FIG. 29

| NON-DCM | 20MHZ (10+10) | 20MHZ (10+10) | 20MHZ (10+10) |
|---|---|---|---|
| $N_{SD}$ | 112 (56+56) | 112 (56+56) | 112 (56+56) |
| $N_{COL}$ | 56 | 28 | 14 |
| $N_{ROW}$ | $2 * N_{BPSCS}$ | $4 * N_{BPSCS}$ | $8 * N_{BPSCS}$ |

FIG. 30

| NON-DCM | 20MHZ (10+10) | 20MHZ (10+10) | 20MHZ (10+10) |
|---|---|---|---|
| $N_{SD}$ | 112 (56+56) | 112 (56+56) | 112 (56+56) |
| $N_{COL}$ | 56 | 28 | 14 |
| $N_{ROW}$ | $2 * N_{BPSCS}$ | $4 * N_{BPSCS}$ | $8 * N_{BPSCS}$ |
| $N_{ROT}$ ($N_{SS}$=1) | 29 | 29 | 29 |

FIG. 31

| DCM | 20MHZ (10+10) | 20MHZ (10+10) | 20MHZ (10+10) |
|---|---|---|---|
| $N_{SD}$ | 56 (28+28) | 56 (28+28) | 56 (28+28) |
| $N_{COL}$ | 28 | 14 | 8 |
| $N_{ROW}$ | $2 * N_{BPSCS}$ | $4 * N_{BPSCS}$ | $7 * N_{BPSCS}$ |

FIG. 32

| DCM | 20MHZ (10+10) | 20MHZ (10+10) | 20MHZ (10+10) |
| --- | --- | --- | --- |
| $N_{SD}$ | 56 (28+28) | 56 (28+28) | 56 (28+28) |
| $N_{COL}$ | 28 | 14 | 8 |
| $N_{ROW}$ | $2 * N_{BPSCS}$ | $4 * N_{BPSCS}$ | $7 * N_{BPSCS}$ |
| $N_{ROT}$ ($N_{SS}=1$) | 11 | 11 | 11 |

FIG. 33

| NON-DCM | 10MHZ $N_{SD} = 56$ | 10+10MHZ $N_{SD} = 56$ |
|---|---|---|
| $D_{TM}$ | 4 (OR 3) | 4 (OR 3) |

FIG. 34

| DCM | 10MHZ $N_{SD} = 28$ | 10+10MHZ $N_{SD} = 28$ |
|---|---|---|
| $D_{TM}$ | 1 | 1 |

FIG. 36

| DCM | 10MHZ $N_{SD}=28$ | 10+10MHZ $N_{SD}=56$ |
|---|---|---|
| $D_{TM}$ | 1 | 4 (OR 3) |

BINARY CONVOLUTIONAL CODING (BCC) INTERLEAVER, DUAL SUB-CARRIER MODULATION (DCM) CONSTELLATION MAPPER, AND LOW-DENSITY PARITY-CHECK (LDPC) TONE MAPPER DESIGN

CROSS-REFERENCE TO RELATED APPLICATION

This application claims the benefit of U.S. Provisional Patent Application No. 62/828,382, filed Apr. 2, 2019, U.S. Provisional Patent Application No. 62/832,481, filed Apr. 11, 2019, and U.S. Provisional Patent Application No. 62/858,920, filed Jun. 7, 2019, which are incorporated by reference herein in their entirety.

TECHNICAL FIELD

The present disclosure generally relates to wireless communications, and more specifically, relates to encoding a bitstream for a frame in a wireless transmission.

BACKGROUND ART

Vehicle to Everything (V2X) is a Direct Short Range Communication (DSRC) wireless technology, which is based on one or more of the Institute of Electrical and Electronics Engineers (IEEE) 802.11p standard, the IEEE 1609 Wireless Access in Vehicular Environment (WAVE) protocol in the U.S., and a European Telecommunications Standards Institute (ETSI) Technical Committee for Intelligent Transport Systems (TC ITS) standard. Devices equipped with V2X technology and applications should work well in rapidly varying communication environments. For example, V2X use cases often involve V2X applications that operate at speeds up to a minimum of 200 km/h for a communication range up to 1 km. The IEEE 802.11p specification supports an Orthogonal Frequency-Division Multiplexing (OFDM) technique with 64 subcarriers.

After considering Direct-Current (DC) and guard tones/subcarriers, the 52 remaining subcarriers are comprised of 48 data subcarriers and 4 pilot subcarriers. In this configuration, the pilot subcarriers transmit a fixed pattern to be used to measure frequency and phase offset by a receiving device. Each of the 48 data subcarriers can be modulated with Binary Phase-Shift Keying (BPSK), Quadrature Phase-Shift Keying (QPSK), 16 Quadrature Amplitude Modulation (QAM), or 64 QAM. In contrast to IEEE 802.11a, IEEE 802.11p uses a half-clocked mode with a 10 MHz bandwidth to ensure a more robust signal in the face of fading. This results in a corresponding data rate reduction with 3 to 27 Mb/s and a single spatial stream.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 7 shows a table that describes fields of a frame format, in accordance with some embodiments of the present disclosure.

FIG. 8 shows a table that includes additional timing parameters to provide a comparison between 20 MHz channel spacing in an IEEE 802.11a network and 10 MHz channel spacing in an IEEE 802.11p network, in accordance with some embodiments of the present disclosure.

FIG. 14 shows a table that includes various parameters for a set of frames, in accordance with some embodiments of the present disclosure.

FIG. 16 shows a table that presents interleaver parameter options, in accordance with some embodiments of the present disclosure.

FIG. 17 shows a table that presents interleaver parameter options, in accordance with some embodiments of the present disclosure.

FIG. 18 shows a table that presents interleaver parameter options, in accordance with some embodiments of the present disclosure.

FIG. 19 shows a table that presents interleaver parameter options, in accordance with some embodiments of the present disclosure.

FIG. 20 shows a table that presents interleaver parameter options, in accordance with some embodiments of the present disclosure.

FIG. 21 shows a table that presents interleaver parameter options, in accordance with some embodiments of the present disclosure.

FIG. 22 shows a table that presents interleaver parameter options, in accordance with some embodiments of the present disclosure.

FIG. 23 shows a table that presents interleaver parameter options, in accordance with some embodiments of the present disclosure.

FIG. 24 shows a table that presents low-density parity-check (LDPC) tone mapper parameter options, in accordance with some embodiments of the present disclosure.

FIG. 25 shows a table that presents LDPC tone mapper parameter options, in accordance with some embodiments of the present disclosure.

FIG. 26 shows a table that presents binary convolution coding (BCC) interleaver parameter options, in accordance with some embodiments of the present disclosure.

FIG. 28 shows a table that presents BCC interleaver parameter options, in accordance with some embodiments of the present disclosure.

FIG. 29 shows a table that presents BCC interleaver parameter options, in accordance with some embodiments of the present disclosure.

FIG. 30 shows a table that presents BCC interleaver parameter options, in accordance with some embodiments of the present disclosure.

FIG. 31 shows a table that presents BCC interleaver parameter options, in accordance with some embodiments of the present disclosure.

FIG. 32 shows a table that presents BCC interleaver parameter options, in accordance with some embodiments of the present disclosure.

FIG. 33 shows a table that presents BCC interleaver parameter options, in accordance with some embodiments of the present disclosure.

FIG. 34 shows a table that presents LDPC tone mapper parameter options, in accordance with some embodiments of the present disclosure.

FIG. 36 shows a table that presents LDPC tone mapper parameter options, in accordance with some embodiments of the present disclosure.

FIG. 37 shows a table that presents LDPC tone mapper parameter options, in accordance with some embodiments of the present disclosure.

DETAILED DESCRIPTION

Figure 1:
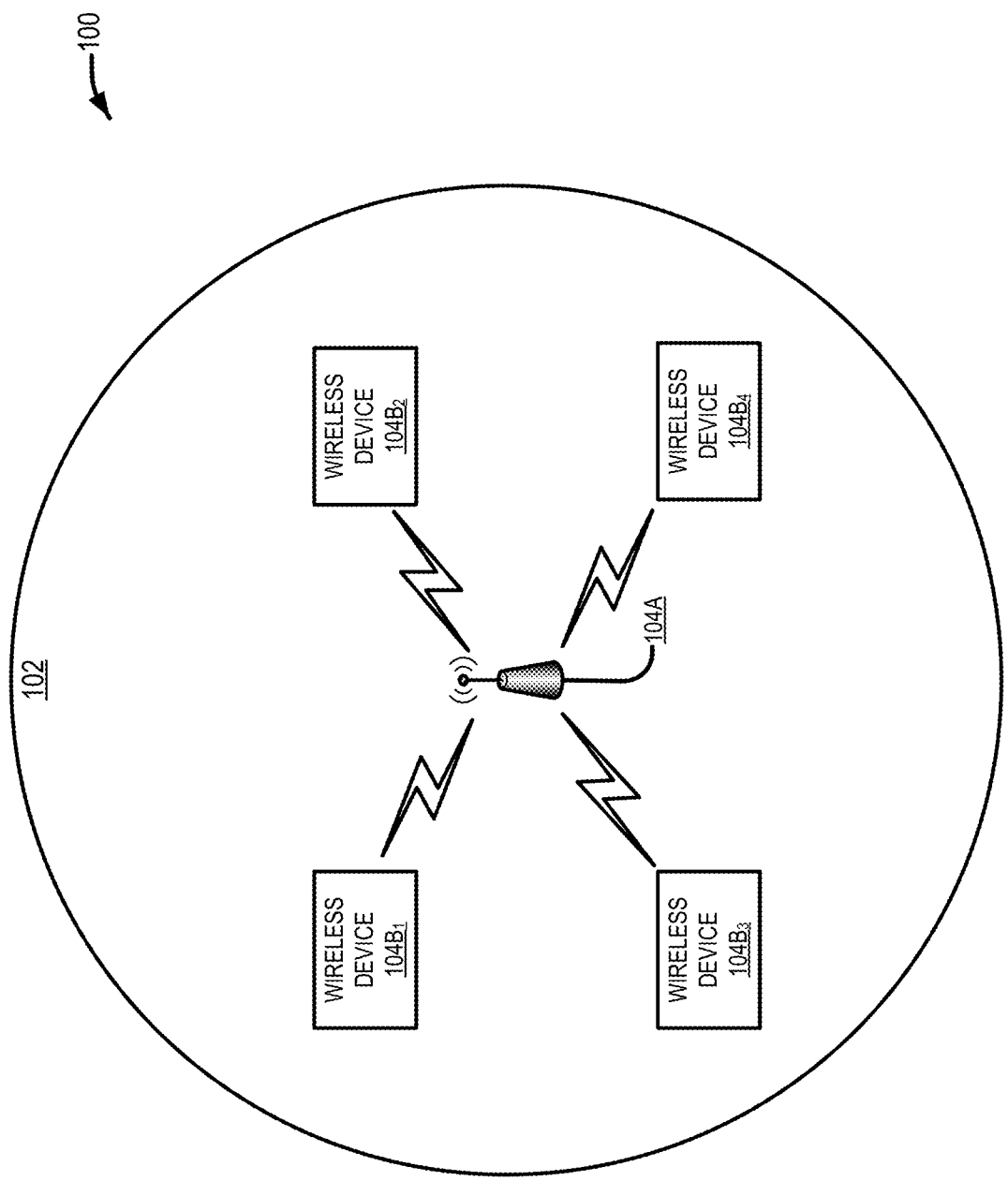
FIG. 1 illustrates an example wireless local area network (WLAN) with a basic service set (BSS) that includes a plurality of wireless devices, in accordance with some embodiments of the present disclosure.

The present disclosure generally relates to wireless communications, and more specifically, relates to encoding a bitstream for a frame in a wireless transmission.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate a RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices $104B_1$-$104B_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices $104B_1$-$104B_4$) may be collectively referred to as STAs. However, for ease of description, only the non-AP STAs may be referred to as STAs. Although shown with four non-AP STAs (e.g., the wireless devices $104B_1$-$104B_4$), the WLAN 100 may include any number of non-AP STAs (e.g., one or more wireless devices 104B).

Figure 2:
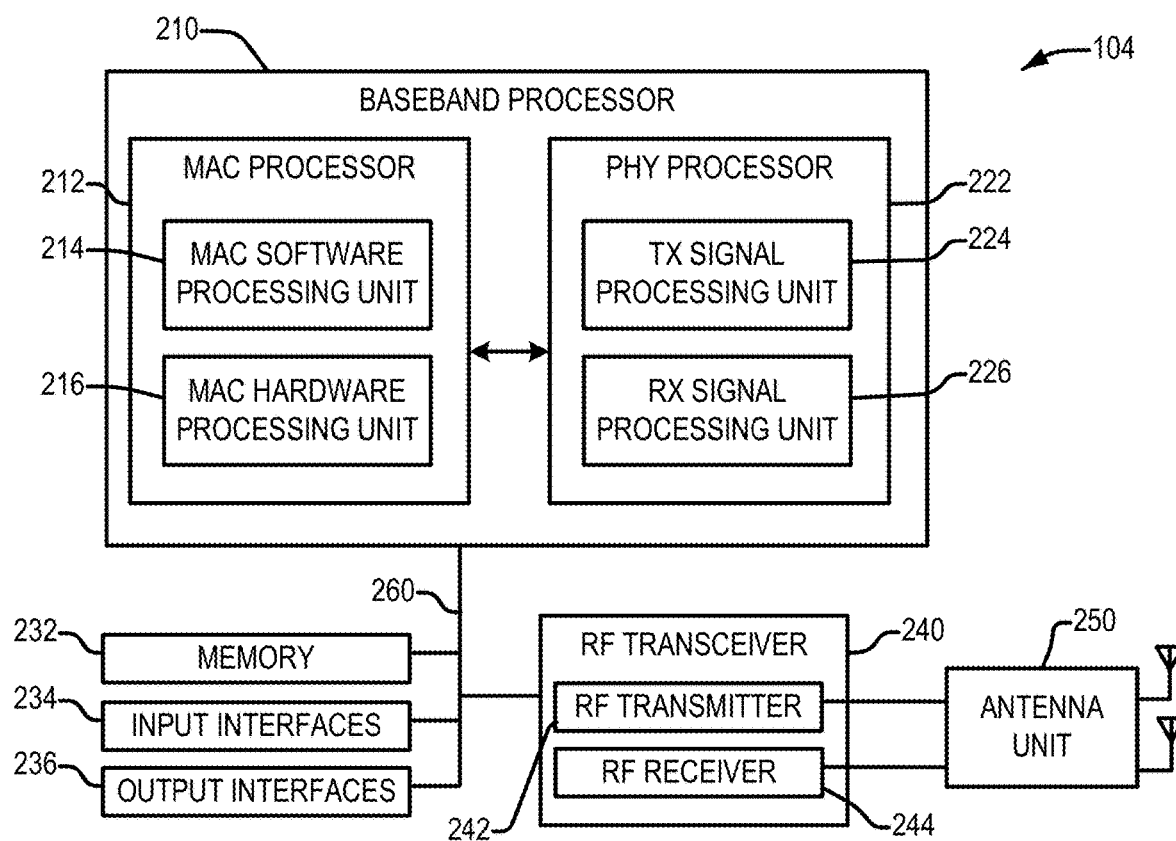
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices $104B_1$-$104B_4$ in FIG. 1. The wireless device 104 includes a baseband processor 210, a radio frequency (RF) transceiver 240, an antenna unit 250, a storage device (e.g., memory) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beam-formed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figure 3A:
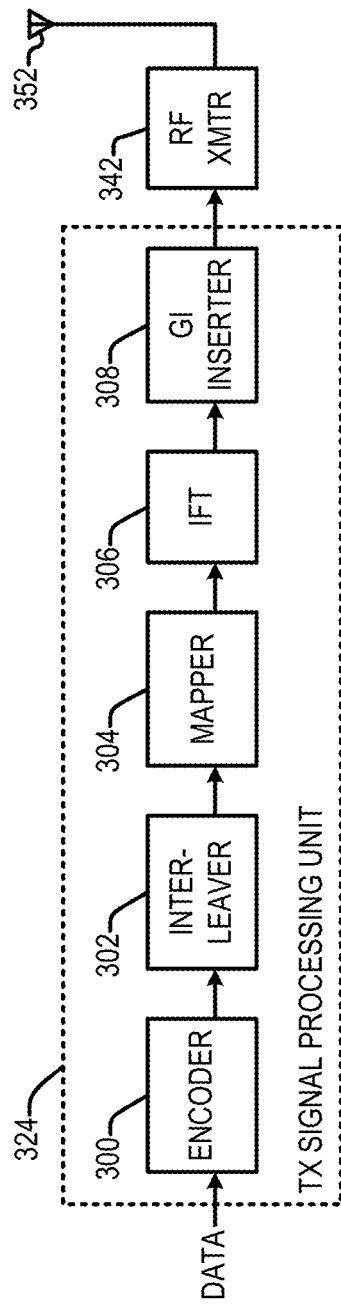
FIG. 3A illustrates components of a wireless device configured to transmit data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
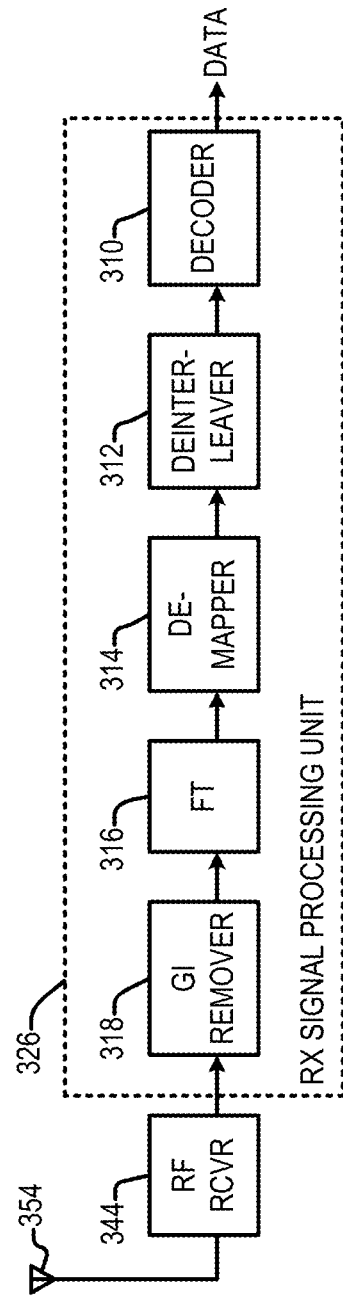
FIG. 3B illustrates components of a wireless device configured to receive data, in accordance with some embodiments of the present disclosure.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 MHz, 20 MHz, 40 MHz, 80 MHz, and 160 MHz contiguous channel widths and support for an 80+80 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
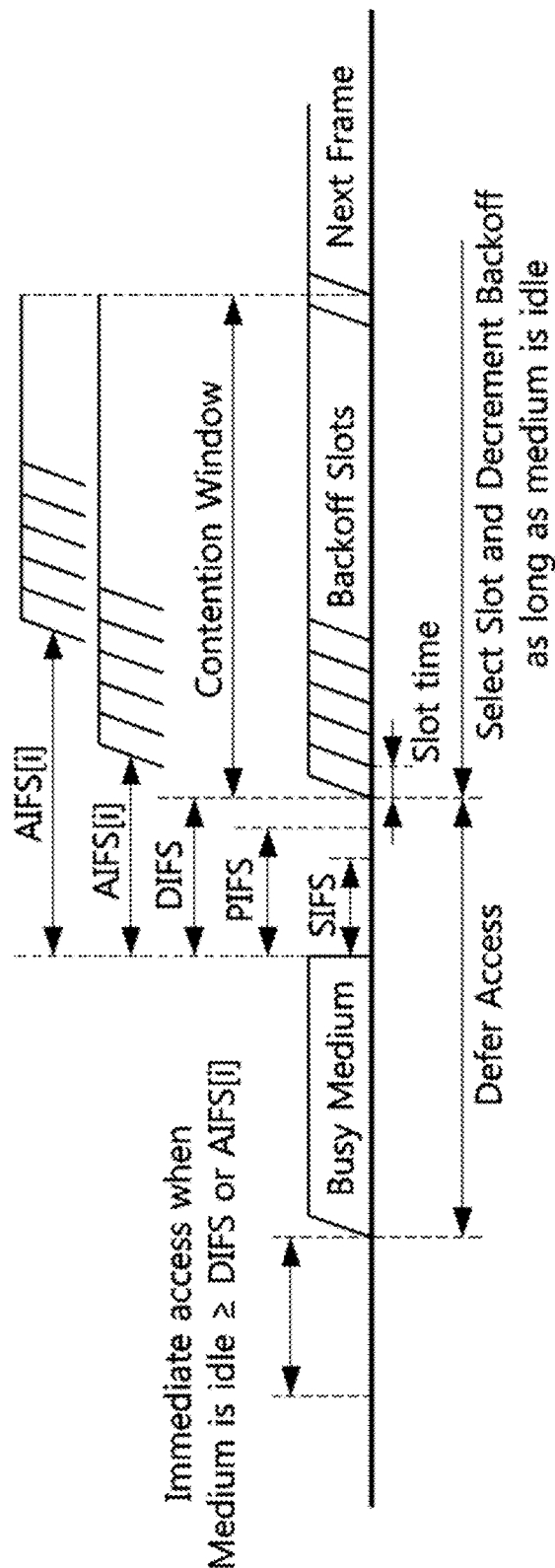
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
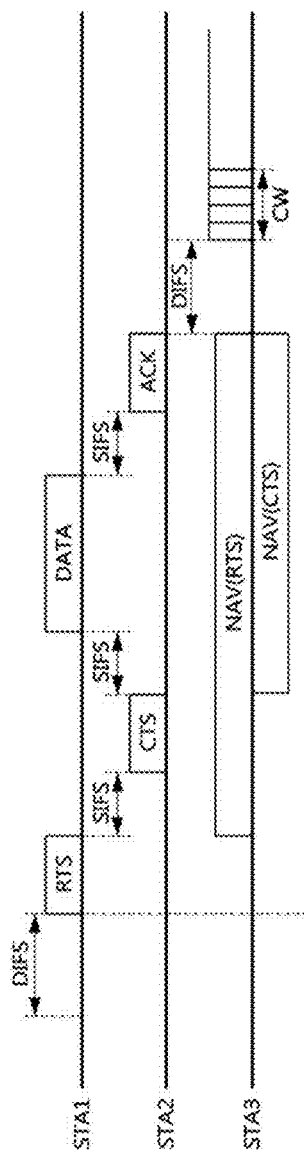
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

Figure 6:
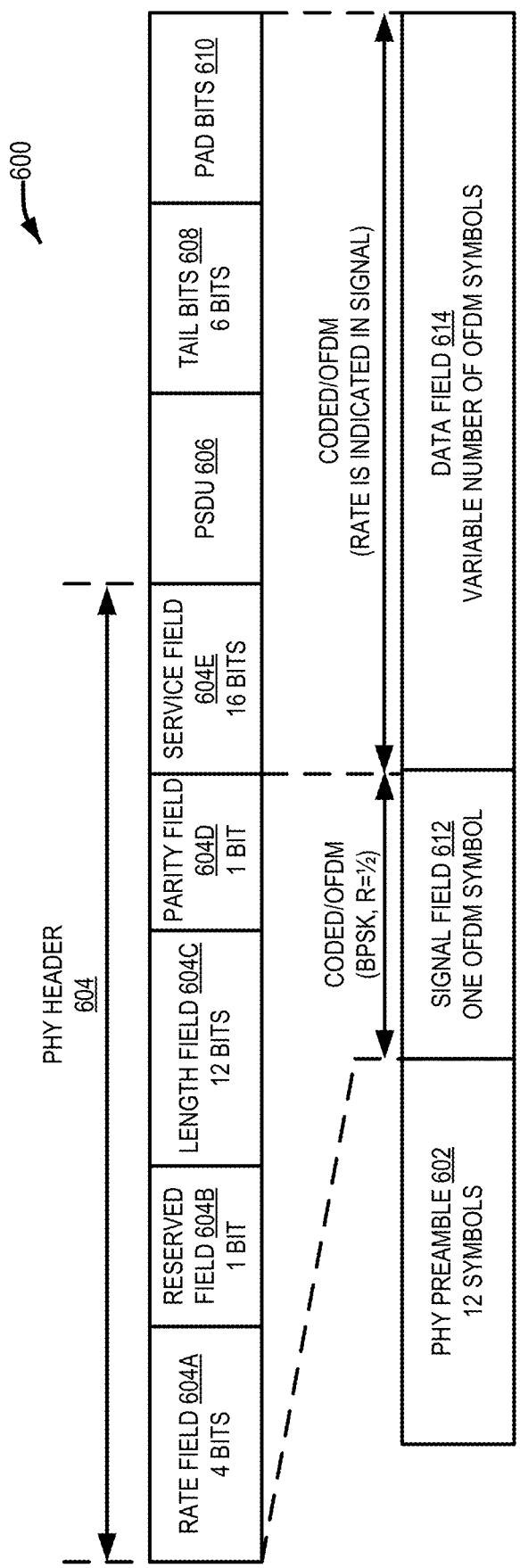
FIG. 6 shows a frame format for wireless communications, in accordance with some embodiments of the present disclosure.

Turning to FIG. 6, a frame format 600 is presented, according to one example embodiment. In some embodiments, the frame format 600 may be used in an IEEE 802.11p network. Namely, the frame format 600 may be used as a physical (PHY) frame format for communications in an IEEE 802.11p network. In particular, a transmitting STA may generate a PHY/PPDU frame using the frame format 600 and transmits the PPDU to a receiving STA. The receiving STA receives, detects, and processes the PPDU frame. As shown in FIG. 6, the frame format 600 includes a PHY preamble 602 (sometimes referred to as a OFDM Physical Layer Convergence Protocol (PLCP) preamble 602), a PHY header 604 (sometimes referred to as a PLCP header 604), a PLCP Service Data Unit (PSDU) 606, tail bits 608, and pad bits 610. As also shown, the frame format 600 may the PHY header 604 may include a rate field 604A of four bits, a reserved field 604B of one bit, a length field 604C of twelve bits, a parity field 604D of one bit, and a service field 604E of 16 bits. Each of the rate field 604A, reserved field 604B, length field 604C, and parity field 604D may be included in a signal field 612 that is one OFDM symbol.

In one embodiment, the PHY preamble 602 includes a legacy-short training field (L-STF) that consists of ten symbols and a legacy-long-training field (L-LTF) that consists of two symbols. In terms of modulation, the rate field 604A, reserved field 604B, length field 604C, and parity field 604D (with six tail and pad bits with a value of zero) constitute a separate single OFDM symbol (i.e., the signal field 612), which is transmitted with the most robust combination of binary phase shift keying (BPSK) modulation and a coding rate of R=1/2. The service field 604E of the PHY header 604 and the PSDU 606 (with six tail and pad bits with a value of zero) (i.e., the data field 614) are transmitted at the data rate described in the rate field 604A and may constitute multiple OFDM symbols. The tail bits in the signal field 612 enable decoding of the rate field 604A and the length field 604C immediately after the reception of the tail bits.

FIG. 7 includes a table 700, which describes fields of the frame format 600. In particular, the table 700 may describe various fields that may be within the PHY preamble 602 of the frame format 600. For example, the table 700 includes definitions 702, durations 704, Discrete Fourier transform (DFTs) periods 706, guard intervals (GIs) 708, subcarrier spacings 710, and a description 710 for one or more of a legacy short training field (L-STF) 714, legacy long training field (L-LTF) 716, legacy signal field (L-SIG) 718, and data field 720. FIG. 8 presents a table 800 that includes additional timing parameters to provide a comparison between 20 MHz channel spacing in an IEEE 802.11a network and 10 MHz channel spacing in an IEEE 802.11p network.

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Considering demanding use cases that touch different environments, networks based on IEEE 802.11p may not be good enough to adequately deliver Direct Short-Range Communications (DSRCs). Further features that may be provided in relation to IEEE 802.11p include advanced coding, varying symbol duration, different guard intervals (GIs), higher data rates, and techniques to deal with high Doppler environments. These features may be included in the successor or an improvement to IEEE 802.11p, which may be developed by or in conjunction with the IEEE 802.11bd working group.

Figure 9:
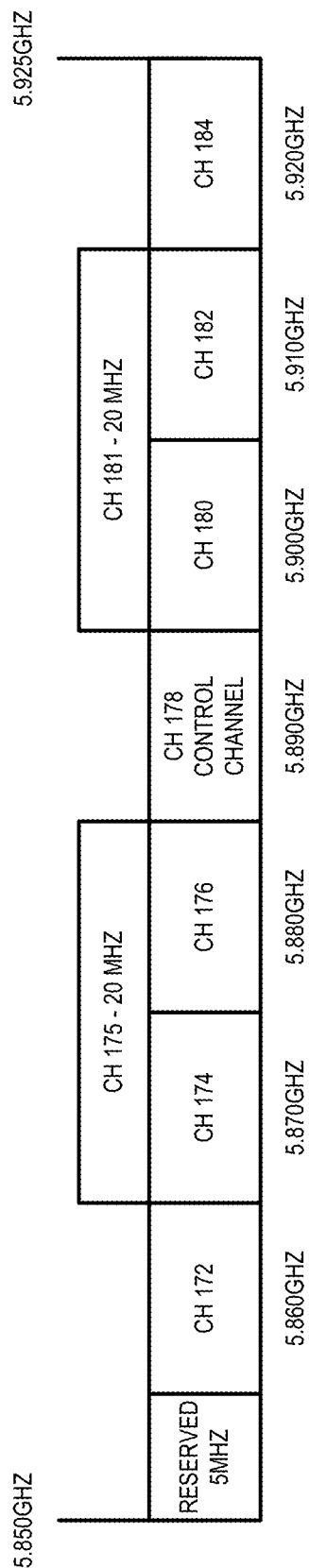
FIG. 9 shows a set of channels in a particular wireless band, in accordance with some embodiments of the present disclosure.

For example, the current DSRC spectrum provides 20 MHz channels that each include two 10 MHz channels, as shown in FIG. 9. Specifically, FIG. 9 shows that there are two 20 MHz channels available in the 5.9 GHz band (e.g., Ch. 175 and Ch. 181). This can allow the use of a wider bandwidth, such as a 20 MHz bandwidth for throughput enhancement. However, with more severe channel conditions, PPDUs in different networks (e.g., networks based on IEEE 802.11bd) might need to be more robust even to send the same data compared to an IEEE 802.11p based PPDU, where the original data is transmitted without being repeated or interleaved over a broad bandwidth to use frequency diversity gain.

Several different frame formats are described herein to extend on IEEE 802.11p. In some embodiments, these frame formats can be incorporated into IEEE 802.11bd or another wireless standard.

Figure 10:
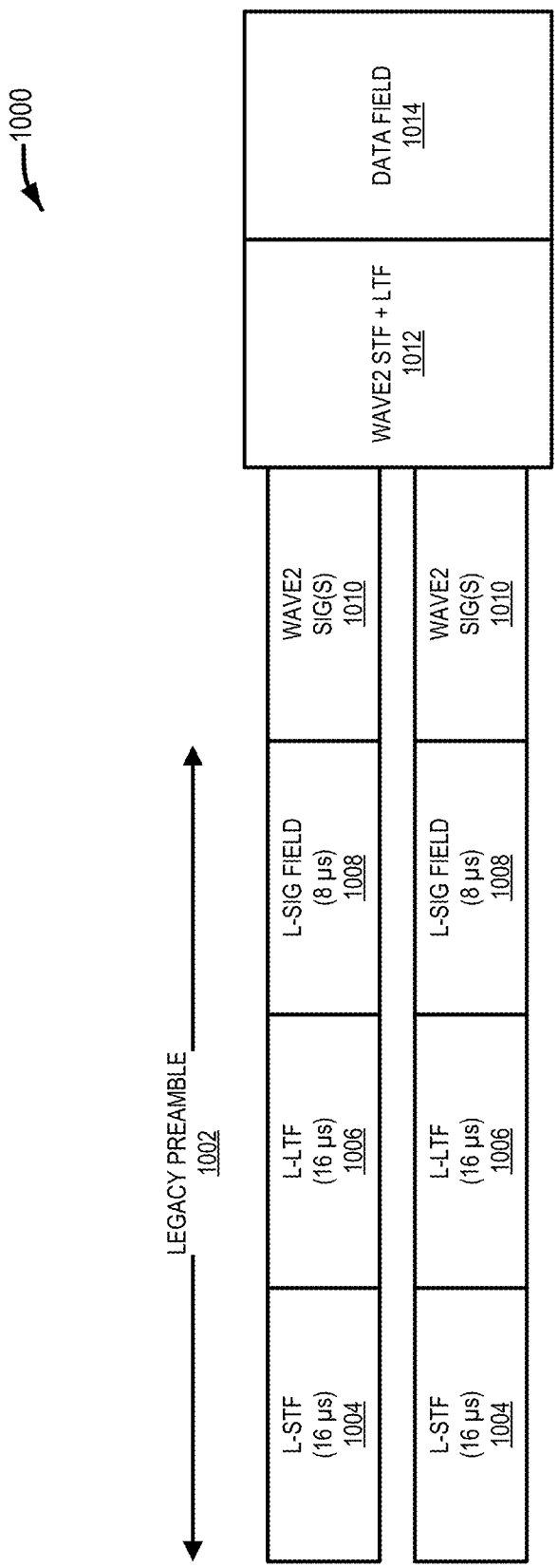
FIG. 10 shows a first frame format, in accordance with some embodiments of the present disclosure.

As shown in FIG. 10, a frame format 1000 for a PPDU may include a repeated legacy preamble 1002 (e.g., repeated on separate subchannels of the PPDU). The frame format 1000 may be for a 20 MHz PPDU that includes two 10 MHz subchannels. In some embodiments, the legacy preamble 1002 is similar or identical to the preamble of a frame format defined in IEEE 802.11p with an L-STF 1004, L-LTF 1006, and L-SIG field 1008. The legacy preamble 1002 may be followed by a repeated WAVE2 SIG field 1010 (e.g., repeated on separate subchannels of the PPDU), a WAVE2 short training field (STF) and long training field (LTF) 1012, and a data field 1014.

Figure 11:
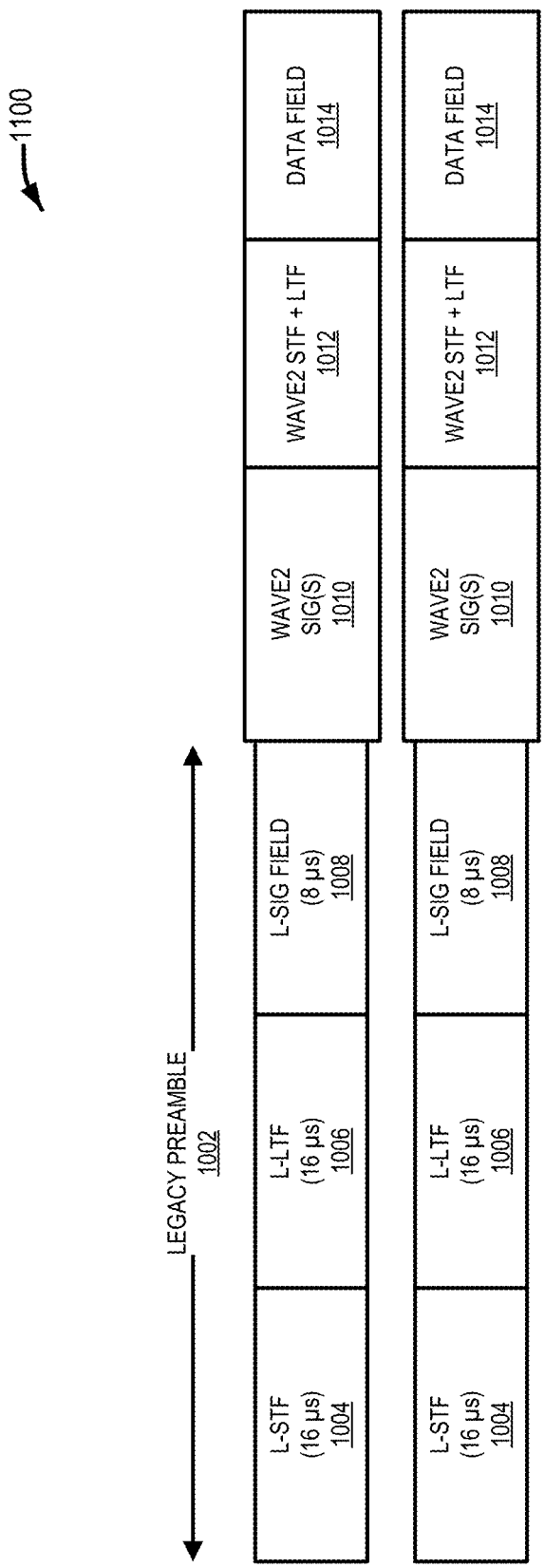
FIG. 11 shows a second frame format, in accordance with some embodiments of the present disclosure.

FIG. 11 shows a frame format 1100 for a PPDU according to another embodiment. The frame format 1100 may be for a 20 MHz PPDU that includes two 10 MHz subchannels. As shown in FIG. 11, the frame format 1100 may include a repeated legacy preamble 1002 (e.g., repeated on separate subchannels of the PPDU). In some embodiments, the legacy preamble 1002 is similar or identical to the preamble of a frame format defined in IEEE 802.11p with an L-STF 1004, L-LTF 1006, and L-SIG field 1008. The legacy preamble 1002 may be followed by a repeated WAVE2 SIG field 1010 (e.g., repeated on separate subchannels of the PPDU) and a repeated WAVE2 short training field (STF) and long training field (LTF) 1012, and a data field 1014. In some embodiments, the data field 1014 in each 10 MHz subchannel may include different data for transmission.

Figure 12:
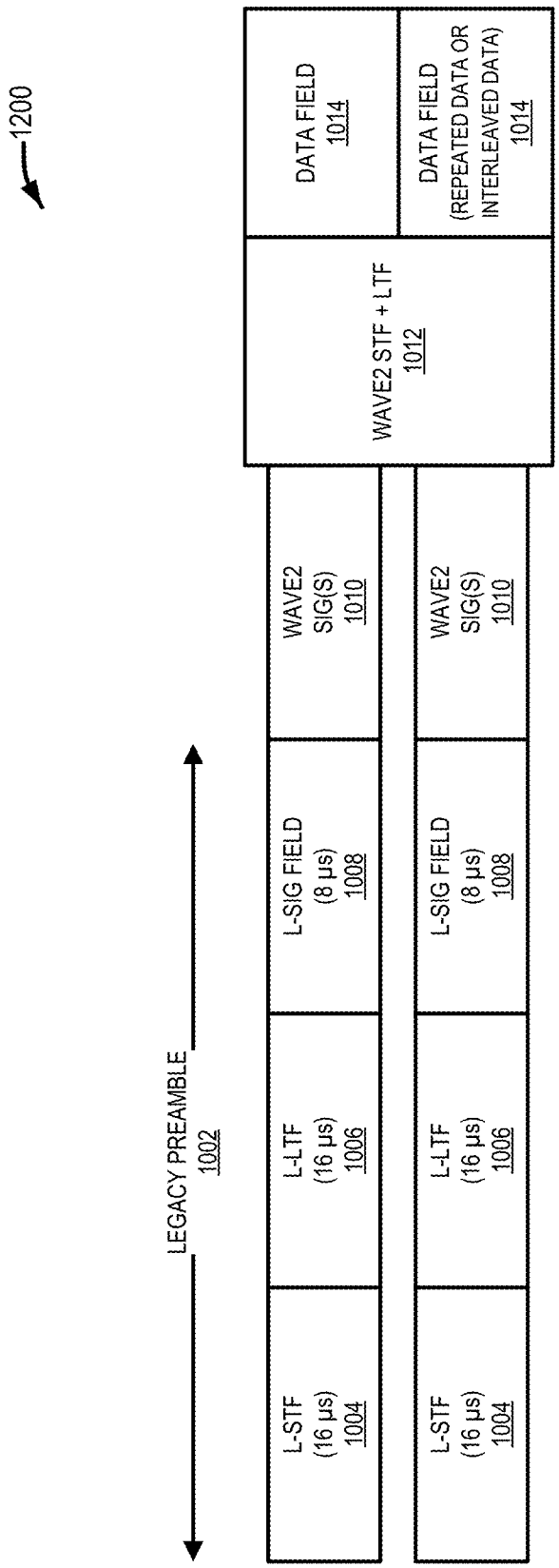
FIG. 12 shows a third frame format, in accordance with some embodiments of the present disclosure.

FIG. 12 shows a frame format 1200 for a PPDU according to another embodiment. The frame format 1200 may be for a 20 MHz PPDU that includes two 10 MHz subchannels. As shown in FIG. 12, the frame format 1200 may include a repeated legacy preamble 1002 (e.g., repeated on separate subchannels of the PPDU). In some embodiments, the legacy preamble 1002 is similar to the preamble of a frame format defined in IEEE 802.11p with an L-STF 1004, L-LTF 1006, and L-SIG field 1008. The legacy preamble 1002 may be followed by a repeated WAVE2 SIG field 1010 (e.g., repeated on separate subchannels of the PPDU) and a WAVE2 short training field (STF) and long training field (LTF) 1012, and a data field 1014. In one embodiment, the data field 1014 in one 10 MHz subchannel can be a copy of the data field 1014 in the other 10 MHz subchannel to enhance robustness of the transmission. For example, a 20 MHz PPDU could be transmitted and received using the frame format 1200 such that the 20 MHz PPDU includes 10 MHz of data on one 10 MHz subchannel that its repeated or interleaved on another 10 MHz subchannel of the 20 MHz bandwidth.

Figure 13:
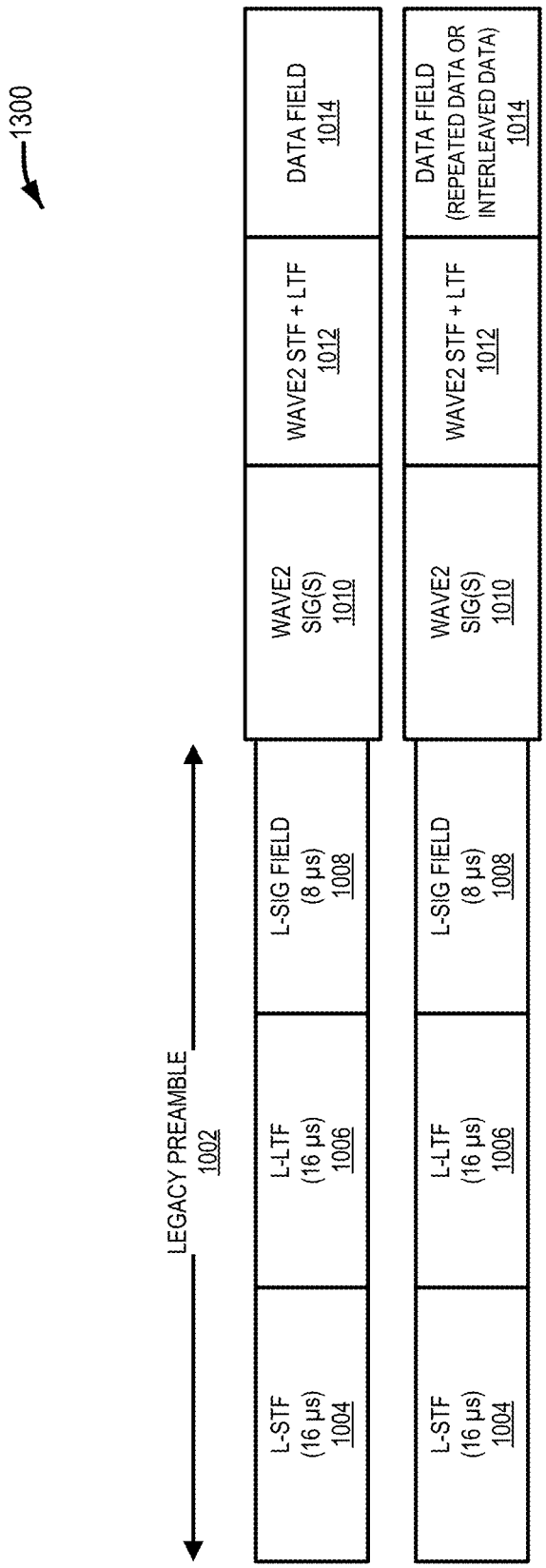
FIG. 13 shows a fourth frame format, in accordance with some embodiments of the present disclosure.

FIG. 13 shows a frame format 1300 for a PPDU according to another embodiment. The frame format 1300 may be for a 20 MHz PPDU that includes two 10 MHz subchannels. As shown in FIG. 13, the frame format 1300 may include a repeated legacy preamble 1002 (e.g., repeated on separate subchannels of the PPDU). In some embodiments, the legacy preamble 1002 is similar to the preamble of a frame format defined in IEEE 802.11p with an L-STF 1004, L-LTF 1006, and L-SIG field 1008. The legacy preamble 1002 may be followed by a repeated WAVE2 SIG field 1010 (e.g., repeated on separate subchannels of the PPDU) and a repeated WAVE2 short training field (STF) and long training field (LTF) 1012, and a data field 1014. In one embodiment, the data field 1014 in one 10 MHz subchannel can be a copy of the data field 1014 in the other 10 MHz channel to enhance robustness of the transmission. For example, a 20 MHz PPDU could be transmitted and received using the frame format 1200 such that the 20 MHz PPDU includes 10 MHz of data on one 10 MHz subchannel that its repeated or interleaved on another 10 MHz subchannel of the 20 MHz bandwidth.

In some embodiments, subcarrier spacing and an effective number of data subcarriers for one or more of the frame formats 1000, 1100, 1200, and 1300 may be based on the table 1400 shown in FIG. 14. In particular, orthogonal frequency-division multiplexing (OFDM) numerology 1402, Fast Fourie transform size ($N_{FFT}$) 1404, a number of data subcarriers per frequency segment ($N_{SD}$) 1406, subcarrier spacing 1408, and a downclock ratio 1410 may be defined for the frame formats 1000, 1100, 1200, and 1300 based on table 1400. For example, as shown in table 1400, for a OFDM numerology 1402 corresponding to a 40 Mhz frame based on IEEE 802.11n, the frame may have an NFFT 1404 of 128, a $N_{SD}$ 1406 of 108, a subcarrier spacing 1408 of 156.25 kHz, and a downclock ratio 1410 of 2.

Although shown with a set of WAVE2 SIG fields 1008, in some embodiments, the set of WAVE2 SIG fields 1008 may not be present in one or more of the frame formats 1000, 1100, 1200, and 1300. In some embodiments, the number of data and pilot tones in the L-LTF 1006 and the number of data and pilot tones in the LTF of the WAVE2 STF and LTF 1012 may be different. For example, while an $N_{SD}$ 1406 in an L-LTF 1006 may be 48, an $N_{SD}$ 1406 in an LTF of the WAVE2 STF and LTF 1012 and data field 1014 may be 108. In another example, while the $N_{SD}$ 1406 in a L-LTF 1006 may be 48, the $N_{SD}$ 1406 in an LTF of the WAVE2 STF and LTF 1012 and data field 1014 may be 104 (52+52).

In some embodiments, when the frame formats 1000 or 1100 are used to transmit A data subcarriers per frequency segment (i.e., $N_{SD}=A$), the frame formats 1200 and 1300 transmit A/2 data subcarriers per frequency segment at the price of more reliability (i.e., $N_{SD}=A/2$).

Figure 15:
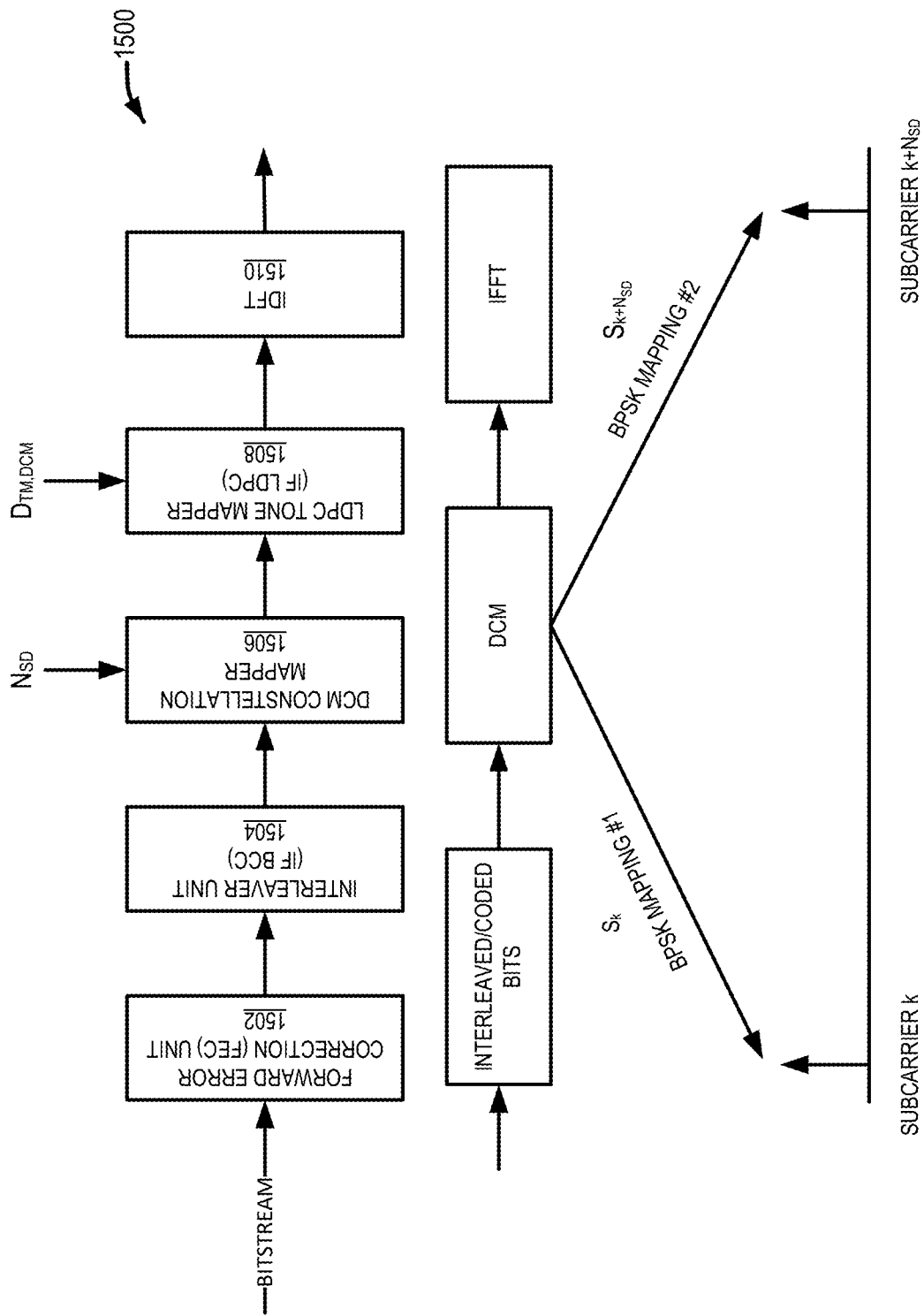
FIG. 15 shows a signal processing system, in accordance with some embodiments of the present disclosure.

FIG. 15 shows a signal processing system 1500, according to one example embodiment. As shown, a signal/bitstream is processed by a forward error correction (FEC) unit 1502 and the resulting coded bits are interleaved by an interleaver unit 1504 (e.g., a BCC interleaver) when binary convolutional coding (BCC) is utilized. Thereafter, the interleaved/error-corrected/coded bits are processed by a dual sub-carrier modulation (DCM) constellation mapper 1506, a low-density parity-check (LDPC) tone mapper 1508 (if LDPC is utilized), and an inverse DFT (IDFT) 1510. The interleaver unit 1504 may receive or otherwise determine a set of interleaving parameters/settings, including (1) a number of rows in a BCC interleaver and (2) a number of columns in the BCC interleaver. The DCM constellation mapper 1506 may receive or otherwise determine a set of parameters/settings, including a number of data subcarriers ($N_{SD}$) for modulating the error corrected bitstream to subcarriers in each half of an orthogonal frequency-division multiplexing (OFDM) symbol. The LDCP tone mapper 1508 may receive or otherwise determine a set of parameters/settings, including a distance between subcarriers ($D_{TM,DCM}$) in the OFDM symbol.

As shown in FIG. 15, $S_k$ and $S_{k+N_{SD}}$ are modulated symbols for data tone k and $k+N_{SD}$ in a DCM feature where $S_k$ and $S_{k+N_{SD}}$ are both binary phase shift keying (BPSK) modulated and $N_{SD}$ is defined as half of $N_{SD}$ in a non-DCM PPDU. To reduce a peak-to-average power ratio (PAPR) for a modulation and coding scheme (MCS) 0 in a DCM modulation, half of the modulated symbols are scrambled with $S_{k+N_{SD}} = S_k e^{j\pi(k+N_{SD})}$.

In some embodiments, when BCC encoding is applied, the encoded bit stream is interleaved by a block interleaver with a block size equal to the number of coded bits in a single OFDM symbol $N_{SBPS}$. In IEEE 802.11p and IEEE 802.11bd, the interleaver can be defined by a two-step permutation. The first permutation (i.e., a frequency mix) ensures that adjacent coded bits are mapped onto nonadjacent tones. The second permutation (i.e., a quadrature amplitude modulation (QAM) reliability mix) ensures that adjacent coded bits are mapped alternately onto less and more significant bits of the constellation and, thereby, long runs of low reliability bits are avoided.

As described herein, an interleaver is described that mixes the transmit bits over the transmission bandwidth such that frequency diversity can be obtained. For example, in one embodiment, the interleaver parameter options for DCM could be those in table 1600 shown in FIG. 16 for different bandwidths. In particular, the table 1600 shows a number of data subcarriers per frequency segment ($N_{SD}$), a number of columns ($N_{COL}$), and a number of rows ($N_{ROW}$) used for a corresponding interleaver for 10 MHz, 20 MHz, and 40 MHz transmissions based on a number of coded bits per subcarrier ($N_{BPSC}$).

In one example embodiment, the frequency rotation $N_{ROT}$ could be defined by table 1700 shown in FIG. 17 along with a number of data subcarriers per frequency segment ($N_{SD}$), a number of columns ($N_{COL}$), and a number of rows ($N_{ROW}$) used for a corresponding interleaver for 10 MHz, 20 MHz, and 40 MHz transmissions. However, the frequency rotation $N_{ROT}$ is not limited to values in the table 1700. In particular, depending on different circumstances, the frequency rotation $N_{ROT}$ can be tested and determined not to provide any noticeable performance degradation when the frequency rotation $N_{ROT}$ is between or equal to 2-58. For example, the values for the frequency rotation $N_{ROT}$ could be selected from {2, 2, 11}, {2, 11, 11}, {2, 11, 29}, or any combination from {2, 11, 29, 58}.

For a 20 MHz PPDU that includes a repeated 10 MHz subchannel and/or a 40 MHz PPDU that includes a repeated 20 MHz subchannel, an interleaver can be used that mixes the transmit bits over the transmission bandwidth such that frequency diversity can be obtained. In particular, a 20 MHz PPDU that includes a 10 MHz subchannel and a repeated or interleaved 10 MHz subchannel can use two set of 10 MHz $N_{COL}$ and $N_{ROW}$ values. The same technique can be applied to a 40 MHz PPDU with a 20 MHz subchannel and a repeated or interleaved 20 MHz subchannel. For example, the interleaver parameter options for DCM, including $N_{ROW}$, $N_{COL}$, and $N_{ROT}$, could be those shown in table 1800 of FIG. 18. In particular, the options shown in table 1800 can be used for a corresponding interleaver for 10 MHz, 20 MHz, and 40 MHz transmissions in an IEEE 802.11bd network.

In one example embodiment, the frequency rotation $N_{ROT}$ along with values for $N_{ROW}$ and $N_{COL}$ could be defined by table 1900 shown in FIG. 19. However, the frequency rotation $N_{ROT}$ is not limited to values in the table 1900. In particular, depending on different circumstances, the frequency rotation $N_{ROT}$ can be tested and determined not to provide any noticeable performance degradation when the frequency rotation $N_{ROT}$ is between or equal to 2-58. For example, the values for the frequency rotation $N_{ROT}$ could be selected from {2, 2, 11}, {2, 11, 11}, {2, 11, 29}, or any combination from {2, 11, 29, 58}. In particular, a 20 MHz PPDU that includes a 10 MHz subchannel and a repeated or interleaved 10 MHz subchannel can use two sets of 10 MHz values for $N_{COL}$, $N_{ROW}$, and $N_{ROT}$. The same technique can be applied to a 40 MHz PPDU with a 20 MHz subchannel and a repeated or interleaved 20 MHz subchannel.

In case of a 20 MHz PPDU that includes one 10 MHz subchannel and a repeated 10 MHz subchannel and/or 40 MHz PPDU that include one 20 MHz subchannel and repeated 20 MHz subchannel, an interleaver can be used that mixes the transmit bits over the transmission bandwidth such that frequency diversity can be obtained. In particular, a 20 MHz PPDU that includes a 10 MHz and a repeated or interleaved 10 MHz subchannel can use two sets of 10 MHz values for $N_{COL}$ and $N_{ROW}$. The same technique can be applied to a 40 MHz PPDU with a 20 MHz subchannel and a repeated or interleaved 20 MHz subchannel. For example, the parameters, including $N_{COL}$ and $N_{ROW}$ values, in table 2000 shown in FIG. 20 can be used for an interleaver for a 10 MHz PPDU, 20 MHz PPDU, a repeated 20 MHz PPDU (i.e., 10 MHZ+10 MHz repeated), a repeated 40 MHz PPDU (i.e., 20 MHZ+20 MHz repeated), and a 40 MHz PPDU for DCM.

In one embodiment, a $N_{ROT}$ value can be set based on table 2100, which is shown in FIG. 21. However, the frequency rotation $N_{ROT}$ is not limited to values in the table 2100. In particular, depending on different circumstances, the frequency rotation $N_{ROT}$ can be tested and determined not to provide any noticeable performance degradation when the frequency rotation $N_{ROT}$ is between or equal to 2-58. For example, the values for the frequency rotation $N_{ROT}$ could be selected from {2, 2, 11}, {2, 11, 11}, {2, 11, 29}, or any combination from {2, 11, 29, 58}. In particular, a 20 MHz PPDU that includes a 10 MHz subchannel and a repeated or interleaved 10 MHz subchannel can use two sets of 10 MHz values for $N_{COL}$, $N_{ROW}$, and $N_{ROT}$. The same technique can be applied to a 40 MHz PPDU with a 20 MHz subchannel and a repeated or interleaved 20 MHz subchannel.

In one embodiment, the parameters, including $N_{COL}$ and $N_{ROW}$ values, in table 2200 shown in FIG. 22 can be used for an interleaver for a 10 MHz PPDU, 20 MHz PPDU, a repeated 20 MHz PPDU (i.e., 10 MHZ+10 MHz repeated), a repeated 40 MHz PPDU (i.e., 20 MHZ+20 MHz repeated), and a 40 MHz PPDU for DCM. In one embodiment, a $N_{ROT}$ value can be set based on table 2300 for DCM, which is shown in FIG. 23. However, the frequency rotation $N_{ROT}$ is not limited to values in the table 2300. In particular, depending on different circumstances, the frequency rotation $N_{ROT}$ can be tested and determined not to provide any noticeable performance degradation when the frequency rotation $N_{ROT}$ is between or equal to 2-58. For example, the values for the frequency rotation $N_{ROT}$ could be selected from {2, 2, 11}, {2, 11, 11}, {2, 11, 29}, or any combination from {2, 11, 29, 58}. In particular, a 20 MHz PPDU that includes a 10 MHz subchannel and a repeated or interleaved 10 MHz subchannel can use two sets of 10 MHz values for $N_{COL}$, $N_{ROW}$, and $N_{ROT}$. The same technique can be applied to a 40 MHz PPDU with a 20 MHz subchannel and a repeated or interleaved 20 MHz subchannel.

Figure 24:
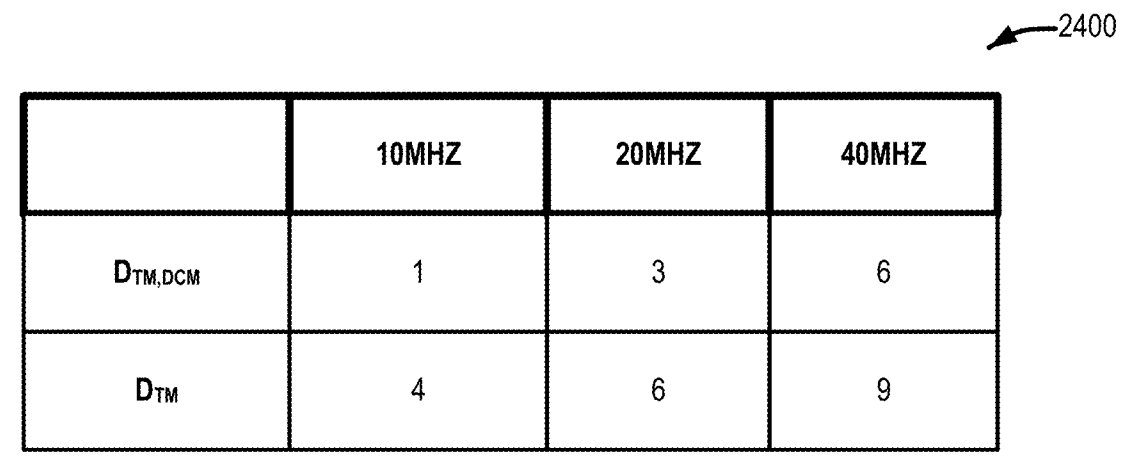
Figure 25:
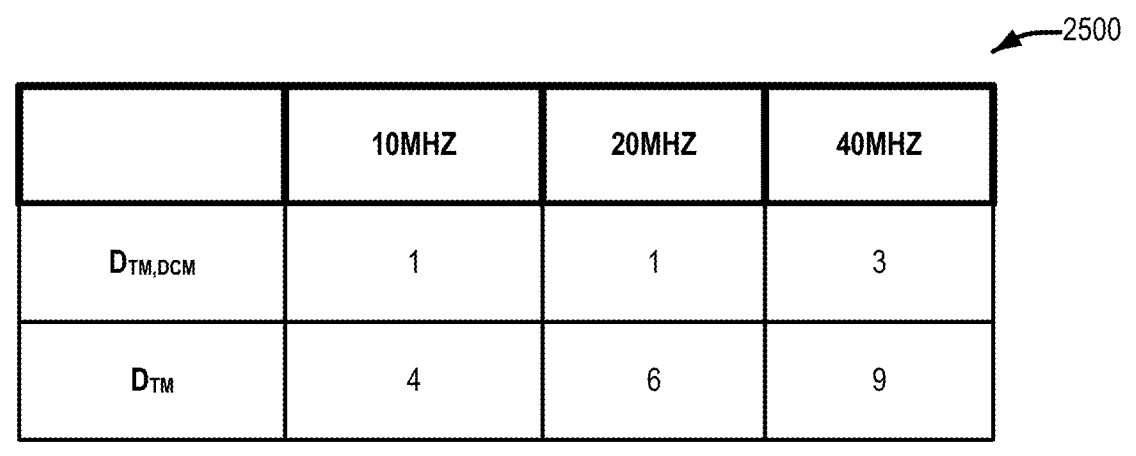

When LDPC encoding is applied to a bit stream, $D_{TM,DCM}$ is the LDPC tone mapping distance parameter when DCM is applied to a signal and $D_{TM}$ is the LDPC tone mapping distance parameter without DCM applied to a signal, wherein the tone mapping for the lower half frequency segment and the upper half frequency segment are identical. For example, parameters for an LDPC tone mapper for DCM may be those presented in table 2400, which is shown in FIG. 24, and/or those presented in table 2500, which is shown in FIG. 25.

Assuming current channel information is up-to-date, pilot tones could be replaced with data tones for better OFDM efficiency. In case of the frame format 1100, a new BCC interleaver and LDPC tone mapper with a new set of $N_{SD}$ values can be used. For example, the BCC interleaver parameters can be those shown in table 2600 in FIG. 26 for non-DCM. For a 20 MHz transmission, the same interleaver of a 10 MHz PPDU is applied to each 10 MHz subchannel.

Figure 27:
FIG. 27 shows a table that presents BCC interleaver parameter options, in accordance with some embodiments of the present disclosure.

In one embodiment, a $N_{ROT}$ value can be set based on table 2700, which is shown in FIG. 27 for non-DCM. However, the frequency rotation $N_{ROT}$ is not limited to values in the table 2700. In particular, depending on different circumstances, the frequency rotation $N_{ROT}$ can be tested and determined not to provide any noticeable performance degradation when the frequency rotation $N_{ROT}$ is between or equal to 2-56.

In one embodiment, BCC interleaver parameters can be those shown in table 2800 in FIG. 28 for DCM. For a 20 MHz transmission, the same interleaver parameters for a 10 MHz PPDU is applied to each 10 MHz subchannel.

In one embodiment, a $N_{ROT}$ value can be set based on table 2900, which is shown in FIG. 29 for DCM. However, the frequency rotation $N_{ROT}$ is not limited to values in the table 2900. In particular, depending on different circumstances, the frequency rotation $N_{ROT}$ can be tested and determined not to provide any noticeable performance degradation when the frequency rotation $N_{ROT}$ is between or equal to 2-28.

In one embodiment, BCC interleaver parameters can be those shown in table 3000 in FIG. 30 for non-DCM. For a 20 MHz transmission, the same interleaver of a 10 MHz PPDU is applied to each 10 MHz subchannel.

In one embodiment, a $N_{ROT}$ value can be set based on table 3100, which is shown in FIG. 31 for non-DCM. However, the frequency rotation $N_{ROT}$ is not limited to values in the table 3100. In particular, depending on different circumstances, the frequency rotation $N_{ROT}$ can be tested and determined not to provide any noticeable performance degradation when the frequency rotation $N_{ROT}$ is between or equal to 2-112.

In one embodiment, BCC interleaver parameters can be those shown in table 3200 in FIG. 32 for DCM. For a 20 MHz transmission, the same interleaver of a 10 MHz PPDU is applied to each 10 MHz subchannel.

In one embodiment, a $N_{ROT}$ value can be set based on table 3300, which is shown in FIG. 33 for DCM. However, the frequency rotation $N_{ROT}$ is not limited to values in the table 3300. In particular, depending on different circumstances, the frequency rotation $N_{ROT}$ can be tested and determined not to provide any noticeable performance degradation when the frequency rotation $N_{ROT}$ is between or equal to 2-56.

Figure 35:
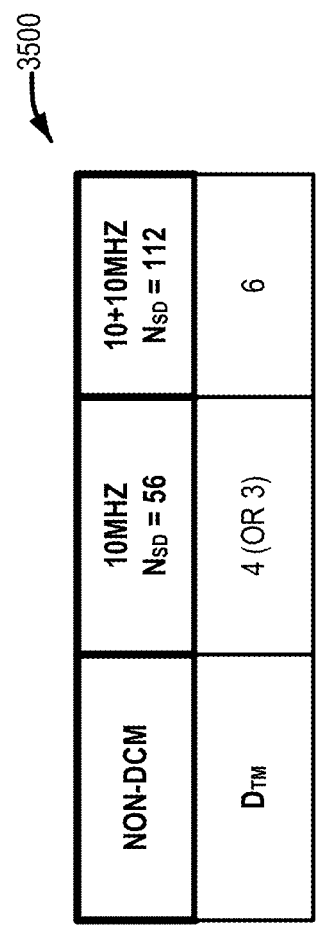
FIG. 35 shows a table that presents LDPC tone mapper parameter options, in accordance with some embodiments of the present disclosure.
Figure 36:
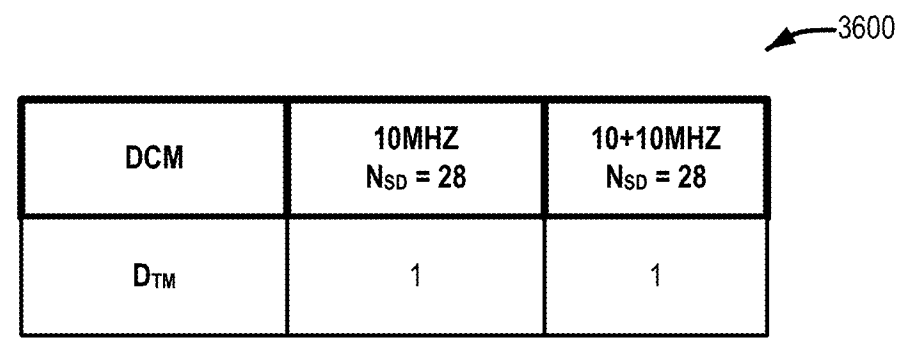

As noted above, when LDPC encoding is applied to a bit stream, $D_{TM,DCM}$ is the LDPC tone mapping distance when DCM is used, wherein the tone mapping for the lower half frequency segment and the upper half frequency segment are identical. For example, parameters for an LDPC tone mapper may be those shown in tables 3400 and 3500, which are shown in FIGS. 34 and 35, respectively, when DCM is not used (i.e., non-DCM) and 3600 and 3700, which are shown in FIGS. 36 and 37, respectively, when DCM is used. In Table 13 and Table 15, for 20 MHz transmission, the same LDPC Tone mapper of 10 MHz PPDU is applied to each 10 MHz subchannel. In tables 3500 and 3700, for a 20 MHz transmission, a new LDPC tone mapper designed for an entire 20 MHz PPDU is applied through 10+10 MHz subchannels.

In one or more embodiments, the parameters outlined above could be used in a wireless standard, including IEEE 802.11bd or 802.11be.

Figure 38:
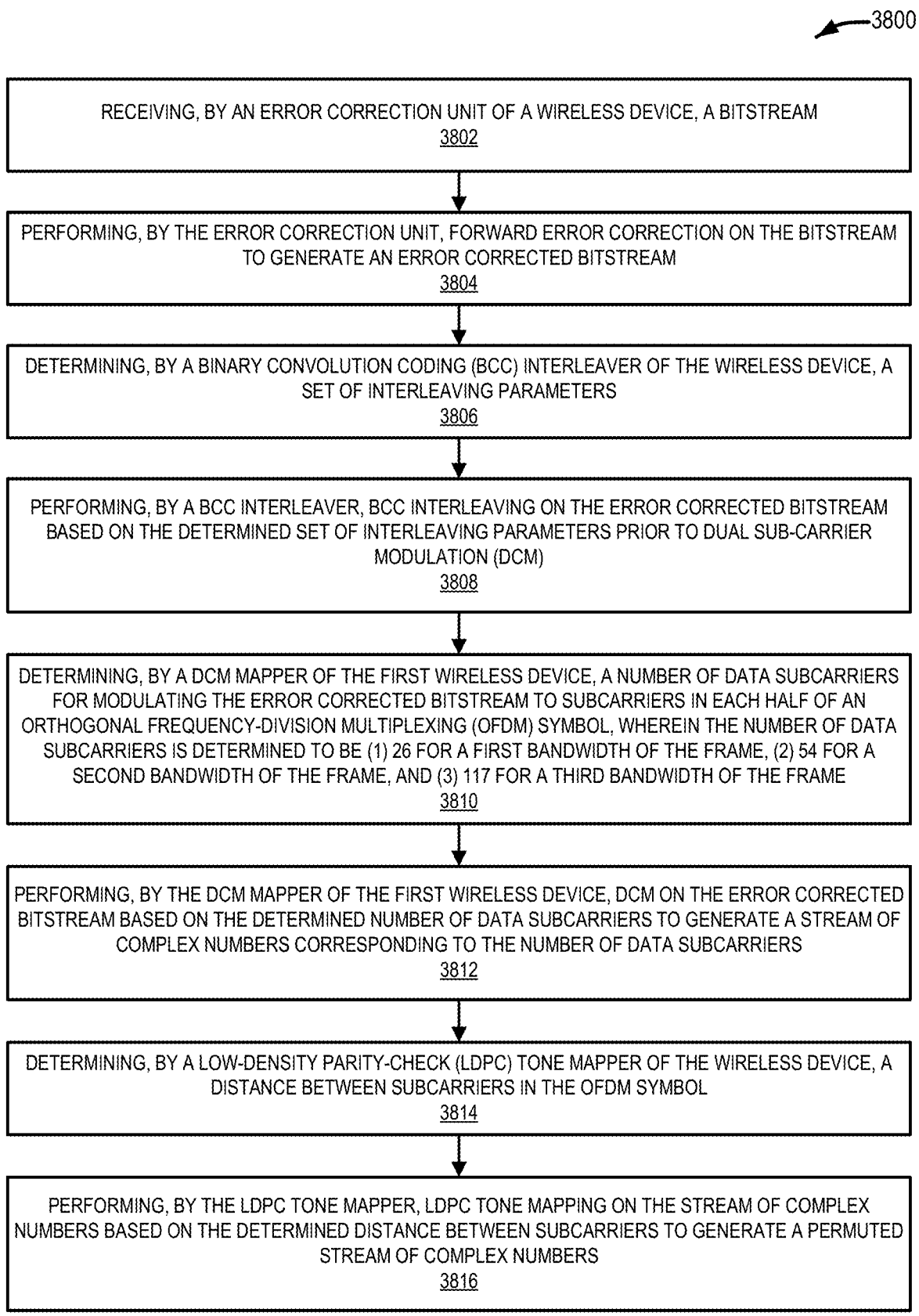
FIG. 38 shows a method for encoding a bitstream for a frame in a wireless transmission, in accordance with an example embodiment.

Turning now to FIG. 38, a method 3800 will be described for encoding a bitstream for a frame in a wireless transmission. Each operation of the method 3800 may be performed by one or more components of a wireless device (e.g., a STA and/or non-AP STA), including one or more components described in other portions of the description. Although described in a particular order, one or more operations may be performed in a different order than that shown in FIG. 38 and described herein. For example, in some embodiments, two or more operations may be performed in partially or fully overlapping time periods. Accordingly, the description of the method 3800 is merely illustrative.

As shown in FIG. 38, the method 3800 may commence at operation 3802 with an error correction unit of a wireless device receiving a bitstream. The bitstream may include user data, including any of the fields of a frame/PPDU described herein, and data management information (e.g., parity bits). In one embodiment, the error correction unit can be the FEC unit 1502 shown in FIG. 15.

At operation 3804, the error correction unit may perform forward error correction of the received bitstream to generate an error corrected bitstream. For example, the FEC unit 1502 may be a BCC unit that performs BCC on the bitstream to generate an error corrected bitstream at operation 3804.

At operation 3806, a BCC interleaver of the wireless device determines a set of interleaving parameters. For example, the DCC interleaver may be the interleaver unit 1504 shown in FIG. 15. In one embodiment, the set of interleaving parameters includes (1) a number of rows in the BCC interleaver and (2) a number of columns in the BCC interleaver. In particular, the BCC interleaver can determine a number of rows and number of columns for the interleaver according to any one of the tables described herein. For example, (1) the number of rows is determined to be two times a number of coded bits per data subcarrier and the number of columns is determined to be thirteen for a first bandwidth, (2) the number of rows is determined to be three times the number of coded bits per data subcarrier and the number of columns is determined to be eighteen for a second bandwidth, and (3) the number of rows is determined to be nine times the number of coded bits per data subcarrier and the number of columns is determined to be thirteen for a third bandwidth. In another example, (1) the number of rows is determined to be two times a number of coded bits per data subcarrier and the number of columns is determined to be thirteen for a first bandwidth, (2) the number of rows is determined to be six times the number of coded bits per data subcarrier and the number of columns is determined to be nine for a second bandwidth, and (3) the number of rows is determined to be nine times the number of coded bits per data subcarrier and the number of columns is determined to be thirteen for a third bandwidth. Although described as the BCC interleaver determining the interleaving parameters, in other embodiments, another component of the wireless device may determine these parameters. The above described interleaving parameters improve performance of the BCC interleaver. For example, when a number of subcarriers ($N_{SD}$) is 26, the product of the number of rows ($N_{ROW}$) and the number of columns ($N_{COL}$) is selected to be equal to 26. This relationship between the number of subcarriers ($N_{SD}$) and the number of rows ($N_{ROW}$) and the number of columns ($N_{COL}$) will help permute encoded data to avoid a number of burst errors beyond error correction capabilities.

At operation 3808, the BCC interleaver performs BCC interleaving on the error corrected bitstream based on the determined set of interleaving parameters. In one embodiment, BCC interleaving is performed prior to performance of dual sub-carrier modulation (DCM), which will be described below.

At operation 3810, a DCM mapper of the wireless device determines a number of data subcarriers for modulating the error corrected bitstream to subcarriers in each half of an orthogonal frequency-division multiplexing (OFDM) symbol. In one embodiment, the number of data subcarriers is determined to be (1) 26 for a first bandwidth of the frame, (2) 54 for a second bandwidth of the frame, and (3) 117 for a third bandwidth of the frame. Although described as the DCM mapper determining a number of data subcarriers for modulating the error corrected bitstream, in other embodiments, another component of the wireless device may determine these parameters. In some cases, the number of data subcarriers is selected to allow reuse of components from legacy devices.

At operation 3812, the DCM mapper performs DCM on the error corrected bitstream based on the determined number of data subcarriers to generate a stream of complex numbers corresponding to the number of data subcarriers.

At operation 3814, a low-density parity-check (LDPC) tone mapper of the wireless device determines a distance between subcarriers (measured in a number of separating subcarriers/tones between subcarriers) in the OFDM symbol. In one embodiment, the distance between subcarriers is determined to be (1) one for the first bandwidth, (2) three for the second bandwidth, and (3) six for the third bandwidth. In another embodiment, the distance between subcarriers is determined to be (1) one for the first bandwidth, (2) one for the second bandwidth, and (3) three for the third bandwidth. As used herein, the first bandwidth is 10 MHz, the second bandwidth is 20 MHz, and the third bandwidth is 40 MHz. However, other bandwidths may be possible. In one embodiment, the distance between subcarriers is determined based on characteristics of the BCC interleaver and/or to provide improved diversity gain in the frequency domain.

At operation 3816, the LDPC tone mapper performs LDPC tone mapping on the stream of complex numbers based on the determined distance between subcarriers to generate a permuted stream of complex numbers.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for encoding a bitstream for a frame in a wireless transmission, the method comprising:
   receiving, by an error correction unit of a wireless device, the bitstream;
   performing, by the error correction unit, forward error correction on the bitstream to generate an error corrected bitstream;
   determining, by a binary convolution coding (BCC) interleaver of the wireless device, a set of interleaving parameters;
   determining, by a dual sub-carrier modulation (DCM) mapper of the wireless device, a number of data subcarriers for modulating the error corrected bitstream to subcarriers in each half of an orthogonal frequency-division multiplexing (OFDM) symbol, wherein the number of data subcarriers is determined to be 26 for a first bandwidth of the frame and 54 for a second bandwidth of the frame, wherein the set of interleaving parameters includes a number of rows and a number of columns, wherein a product of the number of rows in terms of a number of coded bits per data subcarrier and the number of columns is 54 for the second bandwidth;
   performing, by the BCC interleaver, BCC interleaving on the error corrected bitstream based on the determined set of interleaving parameters; and
   performing, by the DCM mapper of the wireless device, DCM on the error corrected bitstream based on the determined number of data subcarriers to generate a stream of complex numbers corresponding to the number of data subcarriers.

2. The method of claim 1, further comprising:
   determining, by a low-density parity-check (LDPC) tone mapper of the wireless device, a distance between subcarriers in the OFDM symbol; and
   performing, by the LDPC tone mapper, LDPC tone mapping on the stream of complex numbers based on the determined distance between subcarriers to generate a permuted stream of complex numbers.

3. The method of claim 2, wherein the distance between subcarriers is determined to be either one subcarrier for the first bandwidth and three subcarriers for the second bandwidth or one subcarrier for the first bandwidth and one subcarrier for the second bandwidth.

4. The method of claim 3, wherein the distance between subcarriers is further determined to be either six subcarriers for a third bandwidth or three subcarriers for the third bandwidth.

5. The method of claim 4, wherein the first bandwidth is 10 MHz, the second bandwidth is 20 MHz, and the third bandwidth is 40 MHz.

6. The method of claim 1, wherein the number of rows is determined to be two times the number of coded bits per data subcarrier and the number of columns is determined to be thirteen for the first bandwidth and the number of rows is determined to be three times the number of coded bits per data subcarrier and the number of columns is determined to be eighteen for the second bandwidth, or wherein the number of rows is determined to be two times the number of coded bits per data subcarrier and the number of columns is determined to be thirteen for the first bandwidth and the number of rows is determined to be six times the number of coded bits per data subcarrier and the number of columns is determined to be nine for the second bandwidth.

7. The method of claim 6, wherein the number of rows is determined to be nine times the number of coded bits per data subcarrier and the number of columns is determined to be thirteen for a third bandwidth or the number of rows is determined to be nine times the number of coded bits per data subcarrier and the number of columns is determined to be thirteen for the third bandwidth; and
   wherein the number of data subcarriers is further determined to be 117 for the third bandwidth of the frame.

8. A device for encoding a bitstream for a frame in a wireless transmission, the device including a set of processing elements and a memory device coupled to the set of processing elements, when the memory device includes instructions that cause the set of processing elements to:
   receive the bitstream;
   perform forward error correction on the bitstream to generate an error corrected bitstream;
   determine a set of interleaving parameters;
   determine a number of data subcarriers for modulating the error corrected bitstream to subcarriers in each half of an orthogonal frequency-division multiplexing (OFDM) symbol, wherein the number of data subcarriers is determined to be 26 for a first bandwidth of the frame, 54 for a second bandwidth of the frame, and 117 for a third bandwidth of the frame, wherein the set of interleaving parameters includes a number of rows and a number of columns, wherein a product of the number of rows in terms of a number of coded bits per data subcarrier and the number of columns is 54 for the second bandwidth;
   perform binary convolution coding (BCC) interleaving on the error corrected bitstream based on the determined set of interleaving parameters; and
   perform dual-subcarrier modulation on the error corrected bitstream based on the determined number of data subcarriers to generate a stream of complex numbers corresponding to the number of data subcarriers.

9. The device of claim 8, wherein the instructions further cause the set of processing elements to:
   determine a distance between subcarriers in the OFDM symbol; and perform low-density parity-check (LDPC) tone mapping on the stream of complex numbers based on the determined distance between subcarriers to generate a permuted stream of complex numbers.

10. The device of claim 9, wherein the distance between subcarriers is determined to be one subcarrier for the first bandwidth, three subcarriers for the second bandwidth, and six subcarriers for the third bandwidth.

11. The device of claim 9, wherein the distance between subcarriers is determined to be one subcarrier for the first bandwidth, one subcarrier for the second bandwidth, and three subcarriers for the third bandwidth.

12. The device of claim 8, wherein the first bandwidth is 10 MHz, the second bandwidth is 20 MHz, and the third bandwidth is 40 MHz.

13. The device of claim 8, wherein the number of rows is determined to be two times the number of coded bits per data subcarrier and the number of columns is determined to be thirteen for the first bandwidth, the number of rows is determined to be three times the number of coded bits per data subcarrier and the number of columns is determined to be eighteen for the second bandwidth, and the number of rows is determined to be nine times the number of coded bits per data subcarrier and the number of columns is determined to be thirteen for the third bandwidth.

14. The device of claim 8, wherein the number of rows is determined to be two times the number of coded bits per data subcarrier and the number of columns is determined to be thirteen for the first bandwidth, the number of rows is determined to be six times the number of coded bits per data subcarrier and the number of columns is determined to be nine for the second bandwidth, and the number of rows is determined to be nine times the number of coded bits per data subcarrier and the number of columns is determined to be thirteen for the third bandwidth.

15. A non-transitory machine-readable storage medium that includes instructions, which when executed by a wireless device, cause the wireless device to:
receive a bitstream for a frame;
perform forward error correction on the bitstream to generate an error corrected bitstream;
determine a set of interleaving parameters;
determine a number of data subcarriers for modulating the error corrected bitstream to subcarriers in each half of an orthogonal frequency-division multiplexing (OFDM) symbol, wherein the number of data subcarriers is determined to be 26 for a first bandwidth of the frame and 54 for a second bandwidth of the frame, wherein the set of interleaving parameters includes a number of rows and a number of columns, wherein a product of the number of rows in terms of a number of coded bits per data subcarrier and the number of columns is 54 for the second bandwidth;
perform binary convolution coding (BCC) interleaving on the error corrected bitstream based on the determined set of interleaving parameters; and
perform dual-subcarrier modulation on the error corrected bitstream based on the determined number of data subcarriers to generate a stream of complex numbers corresponding to the number of data subcarriers.

16. The non-transitory machine-readable storage medium of claim 15, wherein the instructions further cause the wireless device to:
determine a distance between subcarriers in the OFDM symbol; and
perform low-density parity-check (LDPC) tone mapping on the stream of complex numbers based on the determined distance between subcarriers to generate a permuted stream of complex numbers.

* * * * *